United States Patent [19]

Altshuler

[11] Patent Number: 5,816,290

[45] Date of Patent: Oct. 6, 1998

[54] ROTARY CONTROL VALVE FOR A WATER CONDITIONING SYSTEM

[75] Inventor: Edward L. Altshuler, Waukesha, Wis.

[73] Assignee: Fleck Controls, Inc., Brookfield, Wis.

[21] Appl. No.: 615,627

[22] Filed: Mar. 13, 1996

[51] Int. Cl.[6] .................................................. F16K 11/085
[52] U.S. Cl. ..................................... 137/625.47; 137/597
[58] Field of Search ............................... 137/625.47, 597, 137/625.46

[56] References Cited

U.S. PATENT DOCUMENTS

| | | | |
|---|---|---|---|
| 743,714 | 10/1903 | Guese | 137/625.47 |
| 2,996,083 | 8/1961 | Huska | 137/625.47 |
| 3,135,293 | 6/1964 | Hulsey . | |
| 3,692,041 | 9/1972 | Bondi . | |
| 3,973,592 | 8/1976 | Cleaver et al. . | |
| 4,467,832 | 8/1984 | Tamamori | 137/625.47 |
| 4,632,150 | 12/1986 | Gagas . | |
| 4,653,537 | 3/1987 | Voith . | |
| 5,190,077 | 3/1993 | Pawelzik et al. . | |
| 5,244,013 | 9/1993 | Gagas . | |
| 5,273,073 | 12/1993 | Romanchik et al. . | |

Primary Examiner—John Fox

Attorney, Agent, or Firm—Lee, Mann, Smith, McWilliams, Sweeney & Ohlson

[57] ABSTRACT

A rotary control valve is provided for a liquid conditioning system. The rotary control valve includes a housing having a chamber formed about a central axis. The housing includes a plurality of ports aligned with one another along an axis generally parallel to the central axis. A rotor is located within the chamber and is selectively rotatable about the central axis. The rotor includes a central tubular wall extending along the central axis which includes a central fluid flow path. The rotor includes an inlet port adapted to provide fluid communication between the central fluid flow path and a source of untreated liquid. The rotor also includes a plurality of longitudinal sectors wherein each sector includes one or more radial chambers located in one or more tiers of the sector. One or more of the radial chambers in each sector includes an aperture to provide fluid communication between the central fluid flow path and the radial chamber. The radial chambers include respective peripheral apertures adapted to selectively place the radial chambers of a sector in fluid communication with one or more of the ports of the housing when the sector is rotated into alignment with the ports in the housing. Selective rotation of the rotor about the central axis to a selected rotational position opens and closes various fluid paths through the rotor and the housing.

20 Claims, 4 Drawing Sheets

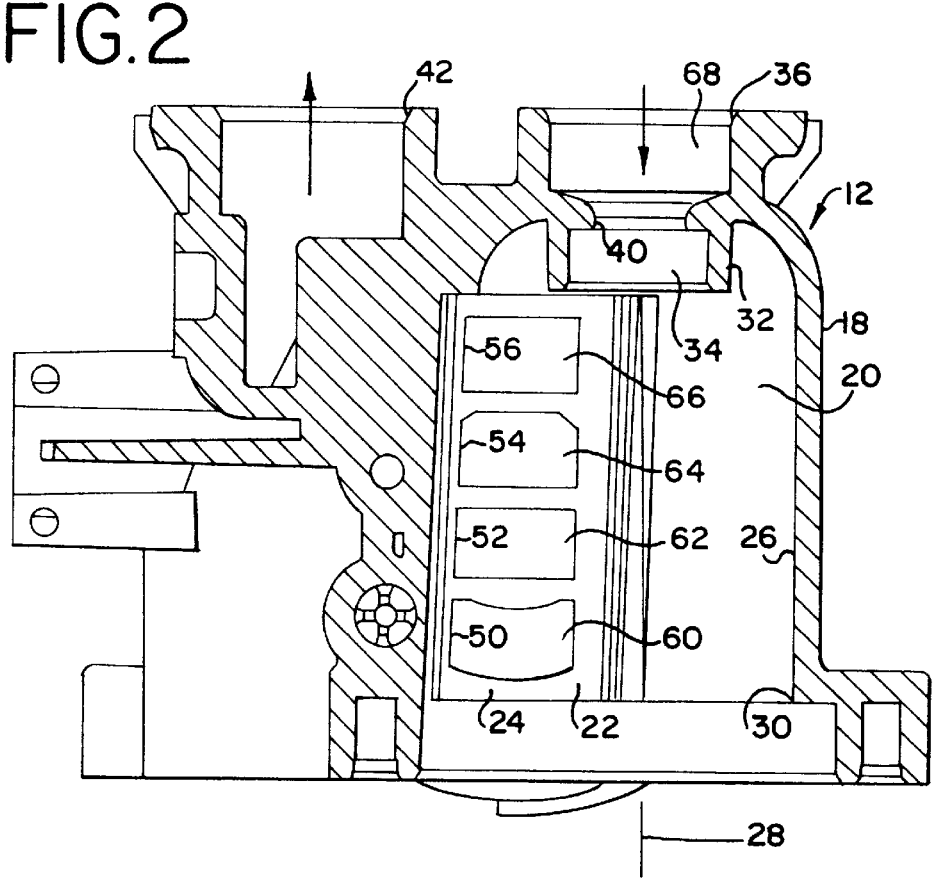
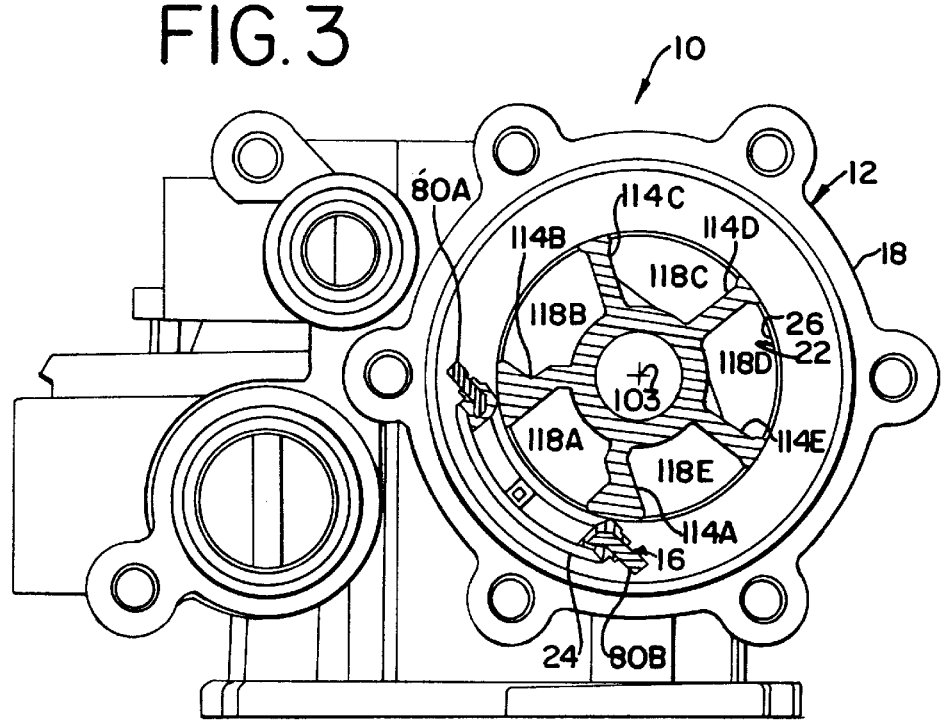

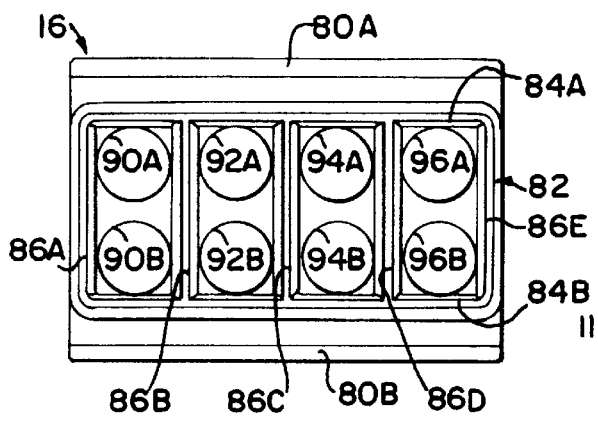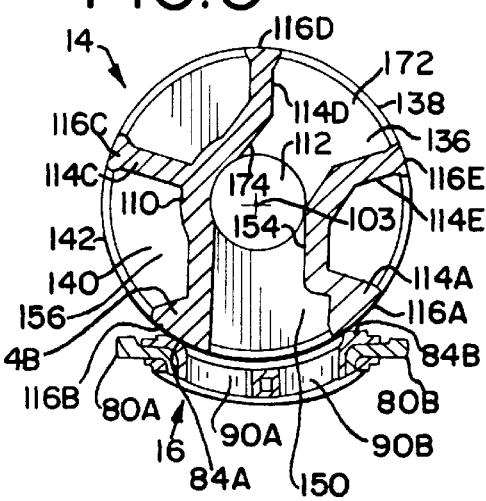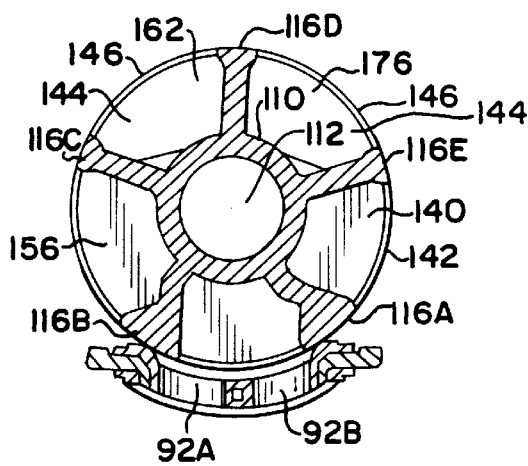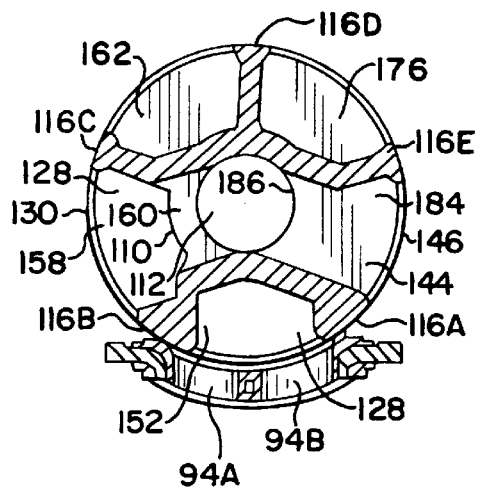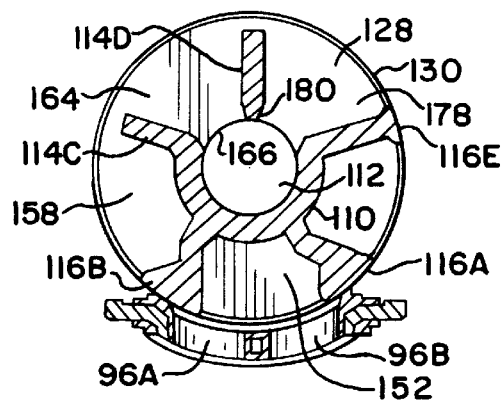

ROTARY CONTROL VALVE FOR A WATER CONDITIONING SYSTEM

BACKGROUND OF THE INVENTION

The present invention is directed to a rotary control valve which may be used in connection with a water conditioning system, and in particular to a rotary control valve including a rotor having a plurality of longitudinal sectors with each sector including one or more radial chambers which selectively open and close fluid flow passages between a mineral tank and a plumbing system as the rotor is selectively rotated between desired rotational positions.

Water conditioning or treatment devices of the ion exchange type, often referred to as water softeners, typically include a tank having a resin bed through which hard water passes to exchange its hardness causing ions of calcium and magnesium for the soft sodium ions of the resin bed. Regeneration of the resin bed is periodically required to remove the accumulation of hardness causing ions and to replenish the supply of sodium ions in the resin. A control mechanism operates a control valve which controls the operation of the water conditioning device. The control valve selectively switches the water conditioning device between a service mode and a regeneration mode. In the regeneration mode, the control valve controls various regeneration cycles such as the backwash cycle, brine cycle, rinse cycle and the brine tank refill cycle.

SUMMARY OF THE INVENTION

A rotary control valve is provided for a liquid conditioning system having a mineral tank with an inlet and an outlet. The rotary control valve includes a housing having a chamber formed by a generally cylindrical side wall having a longitudinal central axis. The housing includes a plurality of ports in the side wall, preferably at least first through fourth ports. The ports are spaced from one another and are aligned in a longitudinal direction generally parallel to the central axis of the chamber.

A generally cylindrical-shaped rotor having a first end and a second end is located within the chamber of the housing. The rotor includes a longitudinal central axis which is coaxial with the central axis of the housing and is selectively rotatable about its central axis. The rotor includes a tubular central wall which extends along its central axis and which includes a central fluid flow path. The rotor includes an inlet port adapted to provide fluid communication between the central fluid flow path and a source of untreated liquid. The rotor includes a plurality of longitudinal walls which extend between the first end and second end of the rotor and which extend generally radially outwardly from the tubular wall. The rotor includes a plurality of longitudinal sectors. Each sector is formed between adjacent longitudinal walls. Each sector includes a first transverse end wall at the first end of the rotor and a second transverse end wall at the second end of the rotor. Each sector also includes one or more intermediate transverse walls located between said first and second end walls. Each sector includes one or more radial chambers, with each chamber being formed between two adjacent longitudinal walls and two adjacent transverse walls. The chambers in each sector are aligned with one another in a longitudinal direction generally parallel to the central axis of the rotor. One or more of the radial chambers in each sector includes an aperture adapted to provide fluid communication between the chamber and the central fluid flow path. Each radial chamber in a sector includes a peripheral aperture adapted to selectively place the radial chambers in fluid communication with one or more of the ports in the housing when the sector is aligned with the ports in the housing.

The rotor is selectively rotatable about its central axis to a selected one of a plurality of rotational positions such that the radial chambers of the sector that is aligned in juxtaposition with the ports of the housing are in fluid communication with the ports of the housing. Various fluid paths extending through the rotor and the ports of the housing are opened and closed as the rotor is selectively rotated between the selected rotational positions of the rotor.

BRIEF DESCRIPTION OF THE DRAWINGS

FIG. 2 is a cross-sectional view of the first body portion of the housing of the rotary control valve.

FIG. 3 is an end view of the first body portion of the housing with the rotor and seal shown in cross-section.

FIG. 4 is a side elevational view of the internal surface of the seal mechanism.

FIG. 5 is a cross-sectional view of the rotor and of the seal mechanism taken along lines 5—5 of FIG. 1.

FIG. 6 is a cross-sectional view of the rotor and of the seal mechanism taken along lines 6—6 of FIG. 1.

FIG. 7 is a cross-sectional view of the rotor and of the seal mechanism taken along lines 7—7 of FIG. 1.

FIG. 8 is a cross-sectional view of the rotor and of the seal mechanism taken along lines 8—8 of FIG. 1.

DETAILED DESCRIPTION OF THE PREFERRED EMBODIMENT

Figure 1:
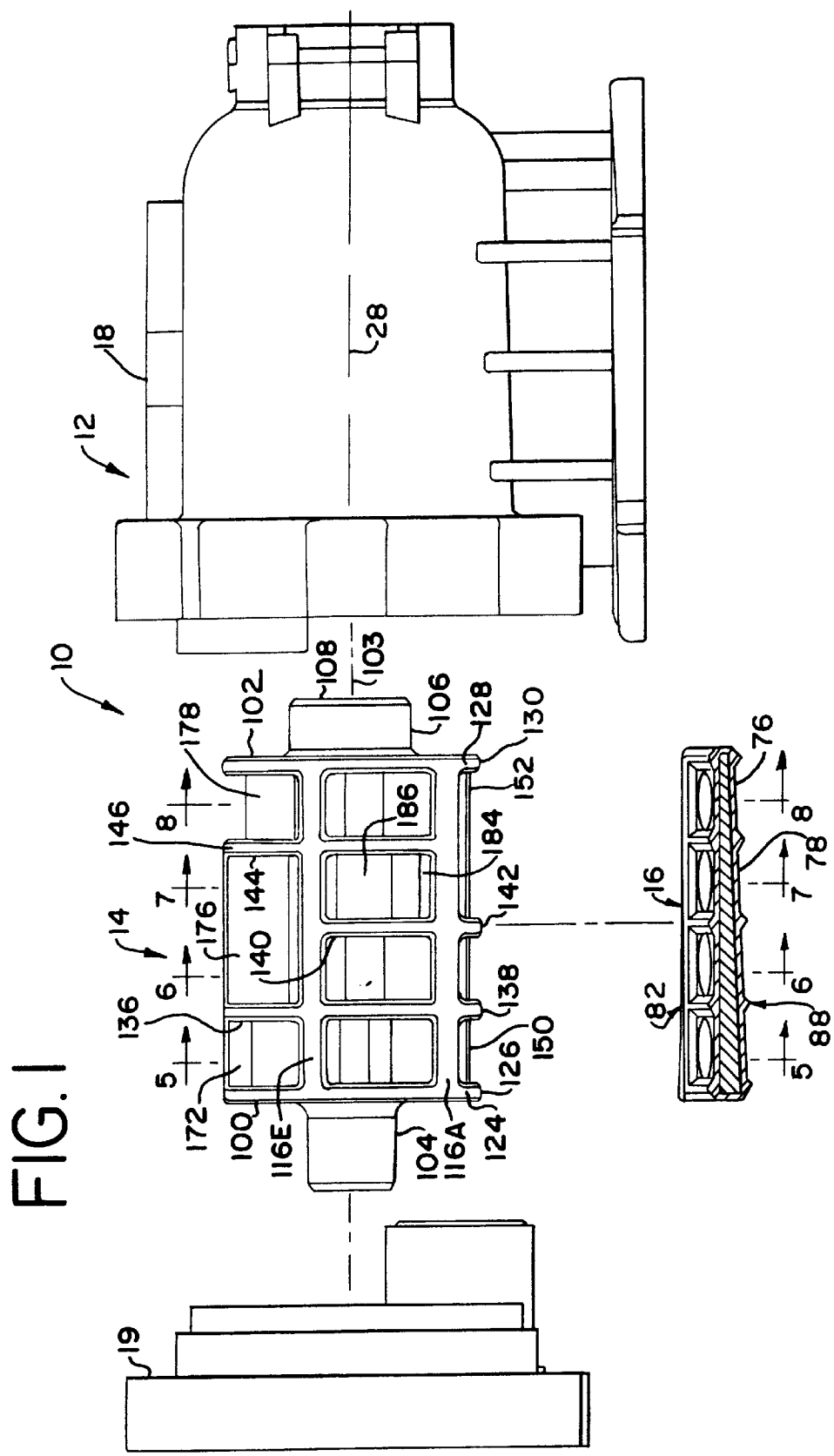
FIG. 1 is an exploded view of the rotary control valve of the present invention.
Figure 9:
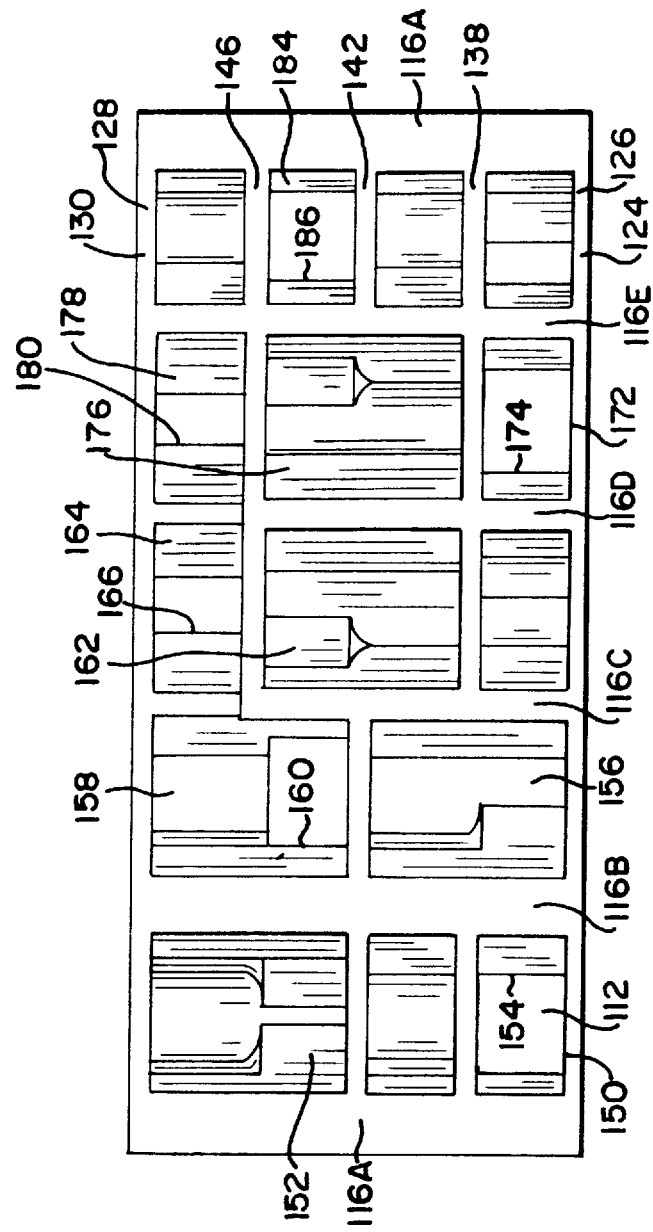
FIG. 9 is a 360° laid out elevational view of the exterior of the rotor.

A preferred embodiment of the rotary control valve 10 of the present invention is shown in FIG. 1. The control valve 10 is adapted for use with a liquid conditioning system including a mineral tank (not shown) having a first port, a second port and a resin bed, and a brine tank (not shown). The liquid conditioning system conditions liquids such as water. The control valve 10 includes a housing 12, a rotor 14 and a seal mechanism 16. The housing 12 includes a first body portion 18 and a second body portion 19 which is selectively connectable and removable from the first body portion 18. As best shown in FIG. 2, the housing 12 includes a generally cylindrical chamber 20 formed by a side wall 22. The side wall 22 also forms a recess 24 adapted to removably receive the seal mechanism 16 and includes a generally cylindrical wall portion 26 that terminates at each side of the recess 24. The cylindrical wall portion 26 is formed about a longitudinally extending central axis 28. The first body portion 18 of the housing 12 includes an aperture 30 located adjacent to the second body portion 19 such that the chamber 20 is open through the aperture 30 when the second body portion 19 is removed from the first body portion 18. The rotor 14 is selectively removable from the first body portion 18 of the housing 12 through the aperture 30.

The first body portion 18 of the housing 12 includes a bearing member 32 having a generally cylindrical recess 34. The housing 12 also includes an inlet port 36 adapted to be connected to an external plumbing system (not shown) having a supply of untreated liquid. An aperture 40 provides a passageway between the inlet port 36 and the recess 34 and chamber 20. The housing 12 also includes an outlet port 42 which is adapted to be connected to a plumbing system which is adapted to receive treated liquid.

As best shown in FIG. 2, the housing 12 includes a first port 50, a second port 52, a third port 54 and a fourth port 56 located in the side wall 22 and within the recess 24. The ports 50, 52, 54 and 56 are in fluid communication with the chamber 20. Although four ports are preferred, the housing 12 can include fewer or more ports if desired. As shown in FIG. 2, each of the ports 50, 52, 54 and 56 are spaced apart from one another and are aligned with one another in a longitudinal direction generally parallel to the central axis 28. Each port 50, 52, 54 and 56 is thereby located at a respective first through fourth level or tier with respect to the central axis 28. The housing 12 includes a first fluid path 60 which is adapted to extend from the first port 50 to a first port of the mineral tank, a second fluid path 62 adapted to extend from the second port 52 to a drain, a third fluid path 64 adapted to extend from the third port 54 to a second port of the mineral tank, and a fourth fluid path 66 adapted to extend from the fourth port 56 to the outlet port 42. A fifth fluid path 68 extends from the inlet port 36 to the aperture 40 in the housing 12.

As best shown in FIG. 1, the seal mechanism 16 includes a rigid support frame 76, preferably made of plastic, which is substantially covered with a resilient elastomeric or rubber gasket material 78 which is adapted to form a seal between the housing 12 and the rotor 14. As best shown in FIG. 3, the seal mechanism 16 is adapted to be inserted into the recess 24 of the housing 12 and the internal and external surfaces of the seal mechanism 16 are curved to conform to the shape of a cylinder. As best shown in FIG. 1, the seal mechanism 16 is generally wedge-shaped such that it can tightly seal the rotor 14 to the housing 12. As shown in FIG. 3, the seal mechanism 16 includes two spaced apart flange members 80A–B which are adapted to be inserted into respective grooves in the housing 12. The seal mechanism 16 includes a resilient ladder seal or gasket 82 formed on the inner surface of the seal member 16 as best shown in FIG. 4. The internal gasket 82 includes two spaced apart and generally parallel longitudinal rib members 84A–B and five spaced apart and generally parallel transverse rib members 86A–E which extend transversely between the longitudinal rib members 84A–B. The internal gasket 82 is adapted to sealingly engage the rotor 14. The seal mechanism 16 also includes a resilient ladder seal or gasket 88 formed on the outer surface of the seal member 16 as shown in FIG. 1 which is constructed substantially identical to the internal gasket 82. The external gasket 88 is adapted to form a seal with the side wall 22 of the housing 12.

The seal mechanism 16 also includes apertures 90A and 90B which are located between the rib members 84A and B and 86A and B, apertures 92A and 92B which are located between the rib members 84A and B and 86B and C, apertures 94A and 94B which are located between rib members 84A and B and 86C and D, and apertures 96A and 96B which are located between rib members 84A and B and 86D and E. Each of the apertures 90A, 92A, 94A and 96A are aligned with one another in a direction substantially parallel to the central axis 28. Each of the apertures 90B, 92B, 94B and 96B are aligned with one another in a direction substantially parallel to the central axis 28. The apertures 90A–B are in fluid communication with the first port 50 and the first fluid path 60 of the housing 12. The apertures 92A–B are in fluid communication with the second port 52 and second fluid path 62. The apertures 94A–B are in fluid communication with the third port 54 and the third fluid path 64. The apertures 96A–B are in fluid communi-cation with the fourth port 56 and the fourth fluid passage 66. The external gasket 88 of the seal mechanism 16 seals each of the ports 50, 52, 54 and 56 from one another along the side wall 22 of the housing 12. The seal mechanism 16 is selectively removable and replaceable within the recess 24 of the housing 12.

As best shown in FIG. 1, the rotor 14 is generally cylindrical and includes a first end 100, a second end 102 and a longitudinal central axis 103. The rotor 14 is positionable within the chamber 20 of the housing 12 such that the central axis 103 of the rotor 14 is coaxial with the central axis 28 of the housing 12. The rotor 14 is selectively rotatable about the central axes 14 and 28 in a clockwise or counter-clockwise direction. A cylindrical shaft 104 projects outwardly from the first end 100 and when the rotor 14 is within the chamber 20 is centrally located on the central axis 103. The shaft 104 is adapted to be received in a bearing member (not shown) in the second body portion 19 of the housing 12 to allow rotation of the rotor 14 about the central axis 103. The shaft 104 includes a recess (not shown) adapted to receive and provide a connection to an actuator member (not shown) which provides selective rotation of the rotor 14. The rotor 14 also includes a generally cylindrical shaft 106 which projects outwardly from the second end 102 and which is concentric with the shaft 104. The shaft 106 is adapted to be rotatably located within the recess 34 of the bearing member 32 to allow selective rotational movement of the rotor 14. The shaft 106 includes a port 108 which is in fluid communication with the aperture 40, the fifth fluid path 68 and the inlet port 36 of the housing 12. The rotor 14 includes a generally tubular central wall 110, best shown in FIG. 6, which extends generally coaxially along the central axis 103 between the first end 100 and the second end 102. A central fluid flow path 112 extends centrally through the rotor 14 from the port 108 through the shaft 106 and the tubular wall 110 to the first end 100 which is a solid wall. The central fluid path 112 is in fluid communication with the fifth fluid path 68 and the inlet port 36 through the port 108 of the rotor 14 and the aperture 40 of the housing 12.

The rotor 14 also includes a plurality of longitudinally extending walls 114A–E, shown in FIG. 3, each of which extends between the first end 100 and second end 102 of the rotor 14, and each of which extends generally radially outwardly from the tubular central wall 110. Each longitudinal wall 114A–E includes a respective longitudinally extending sealing face 116A–E at the radially outward end thereof which is adapted to sealingly engage the longitudinal rib member 84A or 84B of the internal gasket 82 of the seal mechanism 16. As best shown in FIGS. 5–9, the sealing faces 116A and B are wider than the sealing faces 116C–E to provide a larger sealing surface with the sealing mechanism 16 when the rotor 14 is in the service position. The radially outwardly extending longitudinal walls 114A–E divide the rotor 14 into a plurality of longitudinal sectors 118A–E, best shown in FIG. 3. The sector 118A is formed between the longitudinal walls 114A and B, the sector 118B is formed between the longitudinal walls 114B and C, the sector 118C is formed between the longitudinal walls 114C and D, the sector 118D is formed between the longitudinal walls 114D and E, and the sector 118E is formed between the longitudinal walls 114E and 114A. Each sector 118A–E extends from the first end 100 to the second end 102 of the rotor 14.

The rotor 14 also includes a solid transverse circular end wall 124, shown in FIG. 1, at the first end 100 which includes a continuous circular circumferential sealing face 126. The rotor 14 also includes a transverse annular end wall 128 located at the second end 102. The transverse annular end wall 128 includes a continuous circular circumferential sealing face 130. The central fluid path 112 extends through an opening which passes through the annular end wall 128.

The rotor 14 also includes a transverse wall 136, as best shown in FIG. 5, which extends around the central wall 110 in a clockwise direction from the longitudinal wall 114C to the longitudinal wall 114B. The transverse wall 136 does not extend directly between the longitudinal walls 114B and 114C. The transverse wall 136 includes a circular circumferential sealing face 138 which extends in a clockwise direction as shown in FIG. 5 from the longitudinal sealing face 116C to the longitudinal sealing face 116B. The circumferential sealing face 138 does not extend directly between the sealing faces 116B and 116C.

The rotor 14 also includes a transverse wall 140 which extends around the central wall 110 in a clockwise direction as best shown in FIG. 6 from the longitudinal wall 114E to the longitudinal wall 114C. The transverse wall 140 does not extend directly between the longitudinal walls 114C and 114D or directly between the longitudinal walls 114D and 114E. The transverse wall 140 includes a circular circumferential sealing face 142 which extends in a clockwise direction from the longitudinal sealing face 116E to the longitudinal sealing face 116C. The sealing face 142 does not extend directly between the sealing faces 116C and 116D or directly between the sealing faces 116D and 116E.

The rotor 14 also includes a transverse wall 144 as best shown in FIG. 7 which extends around the central wall 110 in a clockwise direction from the longitudinal wall 114C to the longitudinal wall 114A. The transverse wall 144 does not extend directly between the longitudinal walls 114A and 114B or between longitudinal walls 114B and 114C. The transverse wall 144 includes a circular circumferential sealing face 146 which extends in a clockwise direction as shown in FIG. 7 from the longitudinal sealing face 116C to the longitudinal sealing face 116A. The circumferential sealing face 146 does not extend directly between the longitudinal sealing faces 116A and 116B or directly between the longitudinal sealing faces 116B and 116C. As best shown in FIG. 8, the outer edge of the portions of longitudinal walls 114C–D which extend between the transverse walls 144 and 128 are spaced inwardly from the circumferential sealing faces 146 and 130, such that these edge portions of the longitudinal walls 114C–D do not form part of the longitudinal sealing faces 116C–D.

As best shown in FIG. 1, the intermediate transverse walls 136, 140 and 144 are substantially equally spaced between the transverse end walls 124 and 128 along the central axis 28 and are substantially transversely disposed to the central axis 103. The transverse walls divide the rotor into four tiers, with the first tier being located between the transverse walls 124 and 136, the second tier located between the transverse walls 136 and 140, the third tier located between the transverse walls 140 and 144, and the fourth tier located between the transverse walls 144 and 128. The rotor can include additional or fewer transverse walls and tiers if desired. The circumferential sealing face 126 is adapted to sealingly engage the transverse rib member 86A of the seal mechanism 16. The circumferential sealing face 138 is adapted to sealingly engage the transverse rib member 86B. The circumferential sealing face 142 is adapted to sealingly engage the transverse rib member 86C. The circumferential sealing face 146 is adapted to sealingly engage the transverse rib member 86D. The circumferential sealing face 130 is adapted to sealingly engage the transverse rib member 86E.

The sector 118A of the rotor 14 includes a first radially located chamber 150 in the first tier which is formed between the longitudinal walls 114A and B and between the transverse walls 124 and 136. The sector 118A also includes a second chamber 152 located in the third and fourth tiers and which is formed between the longitudinal walls 114A and B and between the transverse walls 128 and 140. The chambers 150 and 152 are aligned with one another in direction generally parallel to the central axis 103. The first chamber 150 includes an inner aperture 154 which provides fluid communication between the central fluid path 112 and the first chamber 150. The first chamber 150 includes a peripheral aperture adapted to provide fluid communication between the first chamber 150 and the port 50 and first fluid path 60 of the housing 12 when the rotor 14 is rotated to a first rotational position, as shown in FIGS. 5–8, wherein the sealing face 116A is sealingly engaged by the longitudinal rib 84B and the sealing face 116B is sealingly engaged by the longitudinal rib 84A of the seal mechanism 16. The chamber 152 is adapted to provide fluid communication between the third port 54 and third fluid path 64 and the fourth port 156 and fourth fluid path 66 when the rotor 14 is rotated to the first rotational position.

The sector 118B of the rotor 14 includes a third chamber 156 located in the first and second tiers and which is formed between the longitudinal walls 114B and 114C and between the transverse walls 124 and 140. The sector 118B also includes a fourth chamber 158 located in the third and fourth tiers and which is formed between the longitudinal walls 114B and C and between the transverse walls 140 and 128. The fourth chamber 158 includes an inner aperture 160 adapted to provide fluid communication between the central fluid path 112 and the fourth chamber 158. The third and fourth chambers 156 and 158 each include a respective peripheral aperture such that when the rotor 14 is rotated to a second rotational position, wherein the sealing face 16B is in sealing engagement with the longitudinal rib 84B of the seal mechanism 16 and the sealing face 116C is in sealing engagement with the longitudinal rib 84A, the third chamber 156 provides fluid communication between the first port 50 and first fluid path 60 and the second port 52 and second fluid path 62 of the housing 12, and the fourth chamber 158 provides fluid communication between the central fluid flow path 112 and the third port 54 and third fluid path 64 and the fourth port 56 and fourth fluid path 66 of the housing 12.

The sector 118C of the rotor 14 includes a fifth chamber 162 located in the second and third tiers and which is formed between the longitudinal walls 114C and 114D and between the transverse walls 136 and 144. The sector 118C also includes a sixth chamber 164 located in the fourth tier and which is formed between the longitudinal walls 114C and 114D and between the transverse walls 144 and 128. The sixth chamber 164 includes an inner aperture 166 which provides fluid communication between the central fluid flow path 112 and the chamber 164. The fifth and sixth chambers 162 and 164 each include a respective peripheral aperture. When the rotor 14 is rotated to a third rotational position, wherein the sealing face 116C is in sealing engagement with the longitudinal rib 84B and the sealing face 116D is in sealing engagement with the longitudinal rib 84A, the fifth chamber 162 provides fluid communication between the second port 52 and second fluid path 62 and the third port 54 and third fluid path 64 of the housing 12, and the sixth chamber 164 provides fluid communication between the central fluid path 112 and the fourth port 56 and fourth fluid path 66 of the housing 12.

The sector 118D of the rotor 14 includes a seventh chamber 172 located in the first tier and which is formed between the longitudinal walls 114D and E and between the transverse walls 124 and 136. The seventh chamber 172 includes an inner aperture 174 adapted to provide fluid communication between the central fluid path 112 and the chamber 172. The sector 118D also includes an eighth chamber 176 located in the second and third tiers and which is formed between the longitudinal walls 114D and E and between the transverse walls 136 and 144. The sector 118D also includes a ninth chamber 178 located in the fourth tier and which is formed between the longitudinal walls 114D and E and between the transverse walls 144 and 128. The ninth chamber 178 includes an inner aperture 180 adapted to provide fluid communication between the central fluid flow path 112 and the chamber 178. The seventh, eighth and ninth chambers 172, 176 and 178 each include a respective peripheral aperture. When the rotor 14 is rotated to a fourth rotational position, wherein the sealing face 116D is sealingly engaged by the longitudinal rib 84B and the sealing face 116E is sealingly engaged by the longitudinal rib 84A of the sealing mechanism 16, the seventh chamber 172 provides fluid communication between the central fluid path 112 and the first port 50 and first fluid path 60 of the housing 12, the eighth chamber 176 provides fluid communication between the second port 52 and second fluid path 62 and the third port 54 and third fluid flow path 64 of the housing 12, and the ninth chamber 178 provides fluid communication between the central fluid path 112 and the fourth port 56 and fourth fluid path 66 of the housing 12.

The sector 118E of the rotor 14 includes a tenth chamber 184 is located in the third tier and which is formed between the longitudinal walls 114E and 114A and between the transverse walls 140 and 144. The tenth chamber 184 includes an inner aperture 186 adapted to provide fluid communication between the central fluid path 112 and the chamber 184. The tenth chamber 184 includes a peripheral aperture, such that when the rotor 14 is rotated to a fifth rotational position wherein the sealing face 116E is sealingly engaged by the longitudinal rib 84B and the sealing face 116A is sealingly engaged by the longitudinal rib 84A, the tenth chamber 184 provides fluid communication between the central fluid flow path 112 and the third port 54 and third fluid flow passage 64 of the housing 12.

In operation, the rotor 14 may be selectively rotated about the central axis 103 to any one of a plurality of rotational positions, such that one of the sectors 118A–E is aligned with seal mechanism 16 and ports in the housing 12. The chambers in the aligned sector are thereby in fluid communication with the ports of the housing 12, but the chambers in the aligned sector are sealed from one another by the inner gasket 82 of the seal mechanism 16. When the rotor 14 is rotated to the first rotational position, wherein the sector 118A of the rotor 14 is aligned with and in fluid communication with the ports of the housing 12, untreated liquid flows through the inlet port 36, through the fifth fluid path 68, the central fluid path 112 and the first chamber 150 to the port 50 and the first fluid path 60 which provides fluid communication with the first port of the mineral tank. Treated liquid from the mineral tank leaves the second port of the mineral tank, passes through the third fluid path 64, through the port 54 into the second chamber 152, through the fourth port 56 and fourth fluid path 66 to the outlet port 42 for distribution.

When the rotor 14 is rotated to the second rotational position, such that the sector 118B is aligned with and in fluid communication with the ports of the housing 12, untreated liquid flows from the inlet port 36, through the fifth fluid path 68, the central fluid path 112, and the fourth chamber 158 to the fourth port 56 and fourth fluid path 66 for distribution through the outlet port 42 and also to the third port 54 and the third fluid path 64 to the second port of the mineral tank to backwash the resin bed. Fluid from the mineral tank flows out of the first port of the mineral tank through the first fluid path 60 and port 50 into the third chamber 56 and therethrough to the second port 52 and second fluid path 62 to the drain.

When the rotor 14 is rotated to the third rotational position, wherein the sector 118C is aligned with and in fluid communication with the ports of the housing 12, untreated liquid flows from the inlet port 36 through the fifth fluid path 68, the central fluid path 112, and the sixth chamber 164 to the fourth port 56 and fourth fluid path 66 for distribution through the outlet port 42. The fifth chamber 162 provides fluid communication from the third fluid path 64 and the third port 54 to the second port 52 and second fluid path 62 such that brine solution, after flowing through the resin bed of the mineral tank, flows to the drain.

The rotor 14 may also be rotated to the fourth rotational position, wherein the sector 118D is aligned with and in fluid communication with the ports of the housing 12. In this position, untreated liquid flows from the inlet port 36 trough the fifth fluid path 68, the central fluid path 112, and the ninth chamber 178 to the fourth port 56 and fourth fluid path 66 for distribution through the outlet port 42. Untreated liquid also flows from the central fluid flow path 112 through the seventh chamber 172 to the first port 50 and first fluid path 60 to the first port of the mineral tank for rinsing the resin bed. Liquid from the resin bed flows from the second port of the mineral tank through the third fluid path 64 and third port 54 to the eighth chamber 176 which provides fluid communication with the second port 52 and second fluid path 62 such that the liquid flows to the drain.

The rotor 14 may be rotated to a fifth rotational position, wherein the sector 118E is aligned with and in fluid communication with the ports of the housing 12. In this position untreated liquid flows from the inlet port 36, through the fifth fluid path 68, the central fluid path 112, and the tenth chamber 184 to the third port 54 and third fluid path 64 to fill the brine tank.

The particular configuration of the rotor 14 can be changed from that shown in the drawings to vary the fluid flow cycles of the valve 10. For example, the rotor 14 may include fewer or additional sectors if desired. In addition, within each sector, radial walls may be added or removed to change the number of chambers within the sector, to change the longitudinal length of the chambers, or to change the longitudinal location of the chambers within a sector. The apertures which provide fluid communication between the central fluid flow path 112 and the chambers may be relocated to provide fluid communication with different chambers of the rotor. Thus the fluid flow paths and cycles of the valve 10, as provided by a first rotor having a particular configuration of sectors, chambers and apertures, may be changed to provide different fluid flow paths and cycles by replacing the first rotor with a second rotor having a different configuration of sectors, chambers and/or apertures.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A rotary control valve arrangement for a liquid conditioning system including:

a housing having a side wall forming a chamber and a plurality of ports formed in said side wall;

a rotor having a first end, a second end and a longitudinal central axis, said rotor adapted to be located within said chamber of said housing and to be selectively rotatable about said central axis, said rotor including a generally tubular wall extending along said central axis, said tubular wall defining a longitudinally extending central fluid path, said rotor including an inlet port adapted to provide fluid communication between said central fluid path and a source of untreated liquid, said rotor including a plurality of longitudinal sectors, a plurality of said sectors including a plurality of radial chambers, one or more of said radial chambers including an aperture providing fluid communication between said central fluid path and said one or more of said radial chambers, each said radial chamber including a peripheral aperture adapted to selectively place said radial chamber in fluid communication with one or more of said ports in said housing and at least one of said radial chambers including a peripheral aperture adapted to selectively place said at least one radial chamber in fluid communication with more than one of said ports in said housing;

wherein said rotor is selectively rotatable about said central axis to a selected one of a plurality of rotational positions such that said radial chambers of one of said sectors are aligned in juxtaposition and in fluid communication with said ports of said housing, whereby various fluid paths extending through said rotor and said ports are opened and closed as said rotor is selectively rotated between said rotational positions.

2. The rotary control valve arrangement of claim 1 wherein said ports in said housing are substantially aligned in a longitudinal direction substantially parallel to said central axis of said rotor.

3. The rotary control valve arrangement of claim 1 wherein each said sector includes spaced apart first and second longitudinally extending seal faces.

4. The rotary control valve arrangement of claim 3 wherein each said sector includes one or more transverse sealing faces extending transversely between said first and second longitudinal seal faces, said longitudinal and transverse seal faces being adapted to seal said radial chambers of a sector that are in fluid communication with said ports of said housing from one another.

5. The rotary control valve arrangement of claim 1 wherein said housing includes a first port, a second port, a third port and a fourth port.

6. The rotary control valve arrangement of claim 5 wherein said rotor includes a first sector having a first radial chamber in fluid communication with said central fluid path and adapted to provide fluid communication with said first port and a second radial chamber adapted to provide fluid communication between said third and fourth ports.

7. The rotary control valve arrangement of claim 6 wherein said rotor includes a second sector including a third radial chamber adapted to provide fluid communication between said first and second ports, and a fourth radial chamber in fluid communication with said central fluid path adapted to provide fluid communication with said third and fourth ports.

8. The rotary control valve arrangement of claim 7 wherein said rotor includes a third sector including a fifth radial chamber adapted to provide fluid communication between said second and third ports, and a sixth radial chamber in fluid communication with said central fluid path adapted to provide fluid communication with said fourth port.

9. The rotary control valve arrangement of claim 8 wherein said rotor includes a fourth sector including a seventh radial chamber in fluid communication with said central fluid path adapted to provide fluid communication with said first port, an eighth radial chamber adapted to provide fluid communication between said second and third ports, and a ninth radial chamber in fluid communication with said central fluid path adapted to provide fluid communication with said fourth port.

10. The rotary control valve arrangement of claim 9 wherein said rotor includes a fifth sector including a tenth radial chamber in fluid communication with said central fluid path adapted to provide fluid communication with said third port.

11. The rotary control valve arrangement of claim 1 including a seal mechanism located between said ports in said housing and said rotor, said seal mechanism including a plurality of transverse ribs and a plurality of apertures, at least one aperture being located between adjacent transverse ribs, said transverse ribs adapted to sealingly engage said rotor.

12. The rotary control valve arrangement of claim 11 wherein said seal mechanism includes first and second spaced apart longitudinal ribs, said transverse ribs extending between said longitudinal ribs, said longitudinal ribs adapted to sealingly engage said rotor.

13. The rotary control valve arrangement of claim 12 wherein said seal mechanism is generally wedge-shaped.

14. The rotary control valve arrangement of claim 11 in which said seal mechanism is arcuate in shape and adapted to be positioned between said rotor and said side wall of said housing.

15. The rotary control valve arrangement of claim 11 in which said seal mechanism includes a pair of spaced apart flange members adapted to secure said seal mechanism to said housing.

16. A rotary control valve arrangement for a liquid conditioning system including:

a housing having a side wall forming a chamber and a plurality of ports formed in said side wall;

a rotor having a first end, a second end and a longitudinal central axis, said rotor adapted to be located within said chamber of said housing and to be selectively rotatable about said central axis, said rotor including a generally tubular wall extending along said central axis, said tubular wall defining a longitudinally extending central fluid path, said rotor including an inlet port adapted to provide fluid communication between said central fluid path and a source of untreated liquid, said rotor including a plurality of longitudinal sectors and a plurality of radial chambers, one or more of said sectors respectively including a plurality of said radial chambers, one or more of said radial chambers respectively including an aperture providing fluid communication between said central fluid path and said one or more of said radial chambers, each said radial chamber including a peripheral aperture adapted to selectively place said radial chamber in fluid communication with one or more of said ports in said housing and at least one of said radial chambers including a peripheral aperture adapted to selectively place said at least one radial chamber in fluid communication with more than one of said ports in said housing;

wherein said rotor is selectively rotatable about said central axis to a selected one of a plurality of rotational positions such that at least one of said radial chambers of one of said sectors is aligned in juxtaposition and in fluid communication with at least one of said ports of said housing, whereby various fluid paths extending through said rotor and said ports are opened and closed as said rotor is selectively rotated between said rotational positions.

17. The rotary control valve arrangement of claim 16 wherein said ports in said housing are substantially aligned in a longitudinal direction substantially parallel to said central axis of said rotor.

18. The rotor control valve arrangement of claim 16 wherein each said sector includes spaced apart first and second longitudinally extending seal faces.

19. The rotary control valve arrangement of claim 18 wherein each said sector includes one or more transverse sealing faces extending transversely between said first and second longitudinal seal faces, said longitudinal and transverse seal faces being adapted to seal said radial chambers of a sector that are in fluid communication with said ports of said housing from one another.

20. The rotary control valve arrangement of claim 16 wherein said housing includes a first port, a second port, a third port and a fourth port.

* * * * *